United States Patent
Morishita

(10) Patent No.: US 11,253,784 B2
(45) Date of Patent: Feb. 22, 2022

(54) TERMINAL DEVICE, PROGRAM, AND METHOD

(71) Applicant: GungHo Online Entertainment, Inc., Tokyo (JP)

(72) Inventor: Kazuki Morishita, Tokyo (JP)

(73) Assignee: GungHo Online Entertainment, Inc.

( * ) Notice: Subject to any disclaimer, the term of this patent is extended or adjusted under 35 U.S.C. 154(b) by 337 days.

(21) Appl. No.: 16/433,342

(22) Filed: Jun. 6, 2019

(65) Prior Publication Data

US 2020/0078686 A1    Mar. 12, 2020

Related U.S. Application Data

(63) Continuation of application No. PCT/JP2018/033604, filed on Sep. 11, 2018.

(51) Int. Cl.
    *A63F 13/69*      (2014.01)
    *A63F 13/95*      (2014.01)
    *A63F 13/35*      (2014.01)

(52) U.S. Cl.
    CPC .............. *A63F 13/69* (2014.09); *A63F 13/35* (2014.09); *A63F 13/95* (2014.09)

(58) Field of Classification Search
    CPC ........... A63F 13/69; A63F 13/35; A63F 13/95
    USPC ...................................................... 463/43, 1
    See application file for complete search history.

(56) References Cited

U.S. PATENT DOCUMENTS

| | | |
|---|---|---|
| 6,375,566 B1 | 4/2002 | Yamada |
| 9,022,863 B2 | 5/2015 | Ando et al. |
| 10,540,827 B1 * | 1/2020 | Jones, Jr. ................. G04F 10/00 |

FOREIGN PATENT DOCUMENTS

| | | |
|---|---|---|
| JP | 2000-157744 A | 6/2000 |
| JP | 2010-017395 A | 1/2010 |
| JP | 2013-230236 A | 11/2013 |
| JP | 2014-083265 A | 5/2014 |
| JP | 2014-150912 A | 8/2014 |
| JP | 5678146 B2 | 2/2015 |

(Continued)

OTHER PUBLICATIONS

Wikipedia, "NCAA Football 09", published on Wikipedia, Nov. 27, 2016, retrieved from Internet URL <https://en.wikipedia.org/wiki/NCAA_Football_09>. (Year: 2016).*

(Continued)

*Primary Examiner* — Jay Trent Liddle
*Assistant Examiner* — Ryan Hsu
(74) *Attorney, Agent, or Firm* — Harness, Dickey & Pierce, P.L.C.

(57) ABSTRACT

A terminal device includes a timer that can count a time in a virtual game, a memory that stores item information regarding a special item associated with player identification information identifying a player and a time limit in which the virtual game is executable, and a processor that performs processing for starting counting of an execution time of the virtual game on the basis of the timer when receiving an instruction input of start of the virtual game via the input interface, stopping the counting of the execution time when receiving an instruction input for the special item by the player via the input interface, resuming the counting of the execution time when a predetermined condition is satisfied in the virtual game, and terminating the virtual game when the execution time reaches the time limit.

20 Claims, 10 Drawing Sheets

(56) References Cited

FOREIGN PATENT DOCUMENTS

| JP | 2015-196063 A | 11/2015 |
|---|---|---|
| JP | 2017-029228 A | 2/2017 |

OTHER PUBLICATIONS

EA Sports Madden NFL, "NCAA Football 09 Interactive Timeouts & Ice the Kicker", published YouTube on Jul. 8, 2008, retrieved from Internet URL <https://www.youtube.com/watch?v=l9WqPeqxQoQ>. (Year: 2008).*

Gameplaystation, "NCAA Football 09—Gameplay (PS3)" published on YouTube on Jan. 26, 2020, retrieved from Internet URL <https://www.youtube.com/watch?v=514YHH8ixwE>. (Year: 2020).*

4Wardprogressmadden, "Madden 17—De-Icing Your Kicker | Management 101", published on YouTube on Nov. 14, 2016, retrieved from Internet URL<https://www.youtube.com/watch?v=1_2wiH0ZATY>. (Year: 2016).*

Wikipedia, "Time-out(sport)", retrieved from wayback machine published on Mar. 27, 2017 from Internet URL<https://www.youtube.com/watch?v=1_2wiH0ZATY&t=2s>. (Year: 2016).*

"Indie Game Corner: The Title of This Week: Transistor", Weekly Famitsu, Nov. 6, 2014, vol. 29, No. 45, pp. 162-163 (Oct. 23, 2014).

\* cited by examiner

FIG. 5A

| PLAYER ID | VIRTUAL ITEM | | STAMINA | HIT POINT |
|---|---|---|---|---|
| | NORMAL ITEM | SPECIAL ITEM | | |
| U1 | UC1,UC2... | AC1,AC2... | S1 | H1 |
| U2 | UC3,UC5... | AC1 | S2 | H2 |
| U3 | UC1,UC6... | AC4,AC6 | S3 | H3 |
| U4 | UC10,UC12... | AC2,AC3... | S4 | H4 |
| ... | ... | ... | ... | ... |

FIG. 5B

| ITEM ID | ATTRIBUTE | CONSUMPTION VALUE | ATTACK POWER | DEFENSE POWER | PHYSICAL POWER | ACTIVATION TIME |
|---|---|---|---|---|---|---|
| UC1 | RED | C1 | A1 | D1 | P1 | T1 |
| UC2 | BLUE | C2 | A2 | D2 | P2 | T2 |
| UC3 | RED | C3 | A3 | D3 | P3 | T3 |
| UC4 | BLUE | C4 | A4 | D4 | P4 | T4 |
| ... | ... | ... | ... | ... | ... | ... |

FIG. 5C

| ITEM ID | ATTRIBUTE | CONSUMPTION VALUE | EFFECT 1 | EFFECT 2 | ACTIVATION TIME |
|---|---|---|---|---|---|
| AC1 | RED | F1 | STOP BLUE COUNTING | E1 | I1 |
| AC2 | BLUE | F2 | STOP RED COUNTING | E2 | I2 |
| AC3 | RED | F3 | STOP RED COUNTING | E3 | I3 |
| AC4 | BLUE | F4 | STOP RED COUNTING | E4 | I4 |
| ... | ... | ... | ... | ... | ... |

TERMINAL DEVICE, PROGRAM, AND METHOD

CROSS-REFERENCE TO RELATED APPLICATIONS

The present application is a continuation application of International Application No. PCT/JP2018/033604, filed on Sep. 11, 2018, which is expressly incorporated herein by reference in its entirety.

BACKGROUND

1. Technical Field

The present disclosure relates to a terminal device, a program, and a method for executing a virtual game executed by an instruction input from a player.

2. Related Art

Conventionally, in virtual games executed by an instruction input from a player, a virtual game is known in which an effect of an item owned by the player is activated according to a time elapsed from the start of the game and a battle against an enemy character is executed. JP 2013-230236 A describes a virtual game in which timing is started when the game is started and a battle screen is displayed, and in a case where an item (card) satisfying a predetermined attack condition (time) exists, an effect of the item (card) is activated.

SUMMARY

Therefore, in view of the above technology, the present disclosure provides a terminal device, a program, and a method capable of advancing not only a virtual game according to time but also more various virtual games by various embodiments.

According to one aspect of the present disclosure, provided is "a terminal device comprising: an input interface configured to receive an instruction input from a player; a timer configured to be able to count a time in a virtual game executed by an instruction input from the player; a memory configured to store computer readable instructions, item information regarding a special item associated with player identification information identifying the player and a time limit in which the virtual game is executable; and a processor configured to execute the computer readable instructions so as to: starting counting of an execution time of the virtual game on the basis of the timer when receiving an instruction input of start of the virtual game via the input interface, stopping the counting of the execution time when receiving an instruction input for the special item by the player via the input interface, resuming the counting of the execution time when a predetermined condition is satisfied in the virtual game, and terminating the virtual game when the execution time reaches the time limit, on the basis of the instruction command".

According to one aspect of the present disclosure, provided is "a computer program product embodying computer readable instructions stored on a non-transitory computer readable storage medium for causing a computer to execute a process by a processor, the computer comprising an input interface configured to receive an instruction input from a player, a timer configured to be able to count a time in a virtual game executed by an instruction input from the player, and a memory configured to store item information regarding a special item associated with player identification information identifying the player and a time limit in which the virtual game is executable, the computer configured to perform the steps of: starting counting of an execution time of the virtual game on the basis of the timer when receiving an instruction input of start of the virtual game via the input interface, stopping the counting of the execution time when receiving an instruction input for the special item by the player via the input interface, resuming the counting of the execution time when a predetermined condition is satisfied in the virtual game, and terminating the virtual game when the execution time reaches the time limit, on the basis of the instruction command".

According to one aspect of the present disclosure, provided is "a method for causing a processor in a computer to execute a process, the computer including an input interface configured to receive an instruction input from a player, a timer configured to be able to count a time in a virtual game executed by an instruction input from the player, and a memory configured to store the computer readable instructions, item information regarding a special item associated with player identification information identifying the player and a time limit in which the virtual game is executable, the method comprising executing the computer readable instructions on the processor the steps of: starting counting of an execution time of the virtual game on the basis of the timer when receiving an instruction input of start of the virtual game via the input interface; stopping the counting of the execution time when receiving an instruction input for the special item by the player via the input interface; resuming the counting of the execution time when a predetermined condition is satisfied in the virtual game; and terminating the virtual game when the execution time reaches the time limit".

According to various embodiments of the present disclosure, a terminal device, a program, and a method capable of advancing not only a virtual game according to time but also more various virtual games can be provided.

Note that the above-described effect is merely an example provided for illustrative purposes only, and is not restrictive. Any effect described in the present disclosure or an apparent effect for a person skilled in the art can be exhibited in addition to or in place of the above-described effect.

BRIEF DESCRIPTION OF THE DRAWINGS

FIG. 5A is a diagram conceptually illustrating a player information table stored in a memory of the server device according to the first embodiment of the present disclosure. FIG. 5B is a diagram conceptually illustrating a normal item information table stored in a memory of the terminal device according to the first embodiment of the present disclosure. Further, FIG. 5C is a diagram conceptually illustrating a special item information table stored in the memory of the terminal device according to the first embodiment of the present disclosure.

DESCRIPTION OF EXEMPLARY EMBODIMENTS

Figure 1:
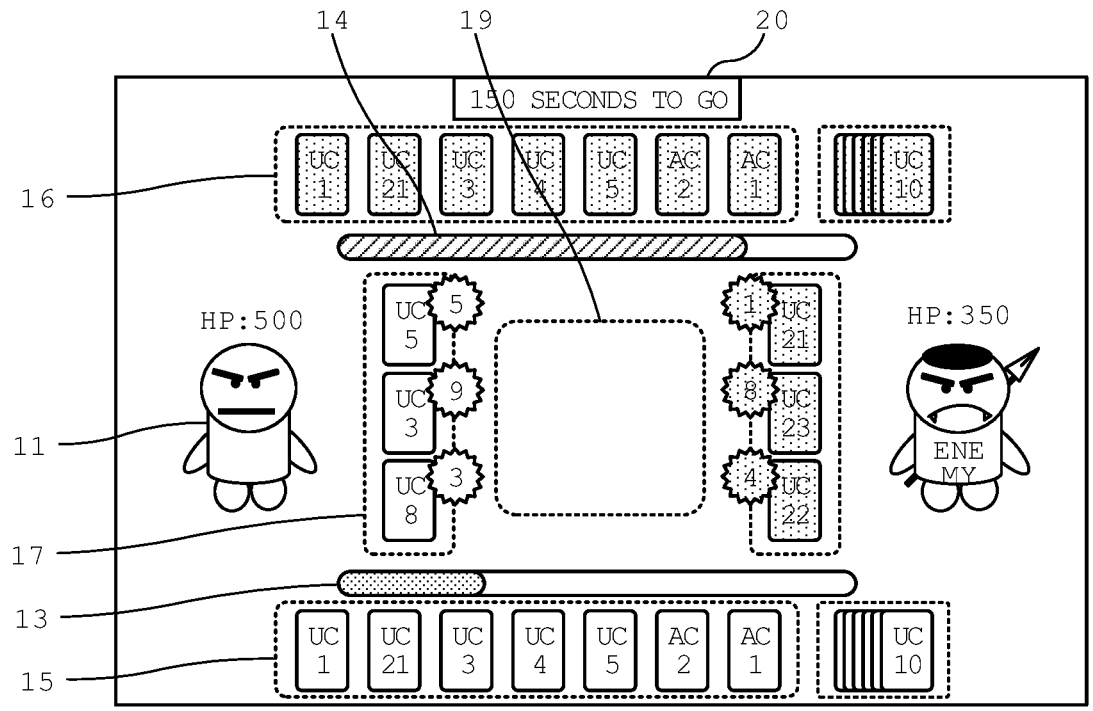
FIG. 1 is a diagram conceptually illustrating a virtual game according to various embodiments of the present disclosure.

Various embodiments of the present disclosure will be described with reference to the appended drawings. Note that the configuration element common in the drawings is denoted with the same reference sign.

Outline of System According to Present Disclosure

A system according to various embodiments of the present disclosure can execute a virtual game that starts counting by a timer at the start of the game and ends when the time reaches a predetermined time limit by the timer. FIG. 1 is a diagram conceptually illustrating a virtual game according to various embodiments of the present disclosure. FIG. 1 illustrates a so-called virtual card battle game as an example of the virtual game. In a virtual game space, a player possesses a predetermined number of virtual items (for example, 50 normal items and 10 special items), and a predetermined number of virtual items (for example, 7 virtual items) is randomly selected and displayed in a selection area 15. The player arranges, in a normal arrangement area 17 or a special arrangement area 19, a desired virtual item among the virtual items displayed in the selection area 15, and applies an attack on an enemy character 12 of an opponent or a virtual item arranged by the opponent, using the arranged virtual item. Note that, in the case where the virtual item is arranged, a virtual item randomly selected from the virtual items in a stock area 21 is replenished to the selection area.

The virtual game counts an execution time from the start of the virtual game and terminates the virtual game when the time reaches a predetermined time limit. An execution time display area 20 displays a remaining time to reach the time limit and notifies the player of the remaining execution time. In the virtual game, execution of the virtual game is terminated when a hit point of a player character 11 or the enemy character 12 becomes zero by the attack applied by the player or the opponent or the execution time becomes zero. At the time of termination, one having more hit points left between the player and the opponent wins the game.

Here, the virtual game includes a normal item UC and a special item AC as the virtual items. A specific effect is associated with each of these virtual items, and the effect is activated when the time from when the virtual item is placed in the normal arrangement area 17 or the special arrangement area 19 reaches an activation time. For example, the activation time of a normal item UC3 arranged in the normal arrangement area 17 is determined to be T3 (10 seconds from the arrangement, for example), and the remaining time (9 seconds, for example) until the activation is displayed on an upper right part of the normal item UC3. Then, after 9 seconds, the normal item UC3 applies an attack of attack power A3 on the enemy character 12. Further, the activation time of a special item AC1 is determined to be I1 (10 seconds from the arrangement, for example) in advance, and the remaining time to the activation is displayed on a right upper part of the special item AC1 when the special item AC1 is arranged in the special arrangement area 19. Then, when the remaining time elapses, the special item AC1 applies an attack of an effect E1 (halving the remaining hit points of the enemy character, for example) on the enemy character. Further, the special item AC1 has an attribute of "red", and in a case where a special item AC having an attribute of "blue" is arranged in advance in the special arrangement area 19 by the opponent, the special item AC1 can stop the counting of the activation time of an effect of the special item AC arranged by the opponent to cancel the effect.

Further, the virtual game has two modes: a normal mode and a special mode different from each other, as progress modes. The mode is transitioned to the normal mode after the start of the virtual game or when the special mode ends. In the normal mode, the player can arrange a desired virtual item in the normal arrangement area 17 or the special arrangement area 19 at desired timing of the player within a range of a stamina value displayed in a stamina display area 13 regardless of an instruction input of the opponent. Further, the virtual game has a predetermined time limit, and when the execution time from the start of the virtual game reaches the time limit, the virtual game ends. In the normal mode, the counting of the execution time is continued.

The mode is transitioned to the special mode when either the player or the opponent arranges the special item AC in the special arrangement area 19 in the normal mode. In the special mode, the player can arrange the virtual items in a predetermined order (for example, alternately) between the player and the opponent. Further, in the special mode, the virtual items that can be arranged by the player or the opponent may be restricted. For example, only the special item AC can be arranged in the special arrangement area 19 and arrangement of the normal item UC may be restricted. The special mode ends when the activation time of the effect of the special item AC arranged in the special arrangement area 19 elapses and the effect is activated, and is transitioned to the normal mode. Note that the counting of the execution time from the start of the virtual game is stopped in the special mode. The counting of the execution time is resumed when the activation time of the effect of the special item AC elapses, the effect is activated, and the special mode is transitioned to the normal mode.

That is, in the virtual game of the present disclosure, progress of more various virtual games becomes possible using a real-time strategy system (the normal mode, for example) in which the player and the opponent can perform instruction inputs at desired timings respectively, and a turn-based strategy system (the special mode, for example) in which the player and the opponent perform the instruction inputs in the predetermined order, in combination. Further, also in the turn system, if the player does not arrange the player's own special item until activation of the effect of the special item arranged by the opponent, the effect of the special item arranged by the opponent is activated. Therefore, temporal restriction is set for the instruction input by the player, and turn-based yet a more thrilling virtual game can be provided.

Note that, in the present disclosure, the "virtual game" is configured by a unit game (for example, one or a plurality of quests, scenarios, chapters, dungeons, missions, combats, battles, fights, stages, or the like) meaning one group of game. The virtual game may be configured by one unit game or may be configured by a plurality of unit games. In the example of FIG. 1, a virtual card battle game is exemplified. Another example of the virtual game of the present disclosure includes every type of virtual games such as a sports game, a fighting game, and a puzzle game, and favorably, a virtual battle game is exemplified.

Further, the "opponent" may be an opponent player who operates a terminal device or may be a virtual player automatically operated by a processor of a terminal device held by the player. The opponent may be one player or a plurality of players. Further, in the case of a plurality of players, the opponent may be configured by only a plurality of opponent players, the opponent may be configured by only a plurality of virtual players, or the opponent may be configured by an appropriate combination of opponent players and virtual players.

Further, in the present disclosure, although the "normal item" and the "special item" are described as examples of the virtual items, "normal" and "special" are mere expression for the purpose of distinguishing both the items. That is, the description "normal item" has no intention to limit the virtual items to those having only "normal" actions, effects, or functions, or with a high frequency of appearance. Further, similarly, the description "special item" has no intention to limit the virtual items to those having only "special" actions, effects, or functions, or with a low frequency of appearance.

Further, in the present disclosure, although the "normal mode" and the "special mode" are described as examples of play modes, "normal" and "special" are mere expression for the purpose of distinguishing both the modes. That is, the description "normal mode" has no intention to limit the modes to those accepting only "normal" actions, effects, or functions, or with a high frequency of appearance/long appearance time. Further, similarly, the description "special mode" has no intention to limit the modes to those accepting only "special" actions, effects, or functions, or with a low frequency of appearance/short appearance time.

First Embodiment

Figure 2:
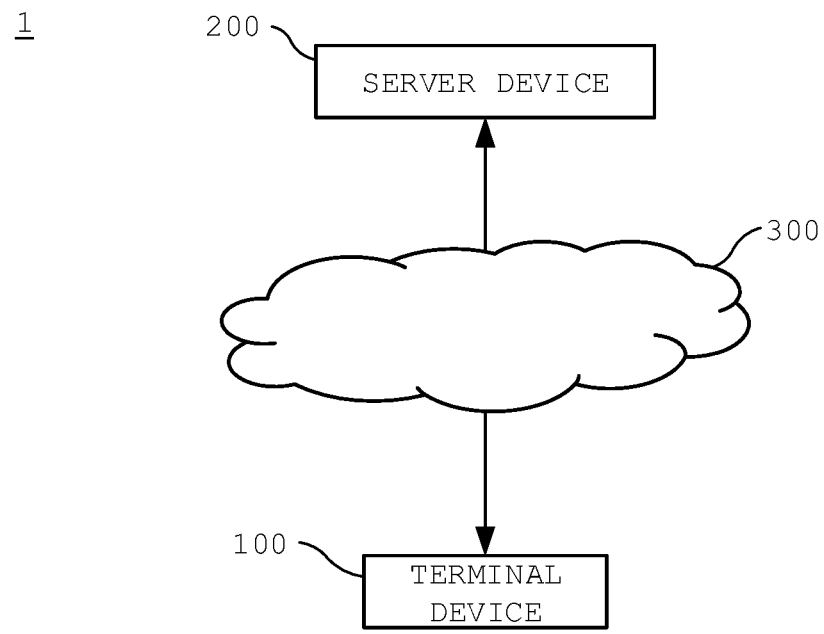
FIG. 2 is a conceptual diagram schematically illustrating a configuration of a system according to a first embodiment of the present disclosure.

1. Configuration of System 1 According to First Embodiment of Present Disclosure FIG. 2 is a conceptual diagram schematically illustrating a configuration of a system 1 according to a first embodiment of the present disclosure. Referring to FIG. 2, the system 1 includes a terminal device 100 and a server device 200 communicatively connected to the terminal device 100 via a network 300. The server device 200 and the terminal devices 100 communicate with each other as needed, and transmit and receive various types of information, programs, and the like necessary for progress of a unit game or an event.

Note that, in the example of FIG. 2, only the terminal device 100 is illustrated. However, a plurality of terminal devices may be connected to the server device 200 in a case where a plurality of players plays against one another. Further, the server device 200 is illustrated as a single server device. However, configuration elements and processing of the server device 200 may be distributed to a plurality of server devices. Further, if programs, information, and the like necessary for executing the virtual game of the present disclosure are stored in advance in a memory 113 of the terminal device 100, the virtual game can be executed even if the terminal device 100 is not connected to the server device 200 via the network 300.

2. Configuration of Terminal Device 100

Figure 3:
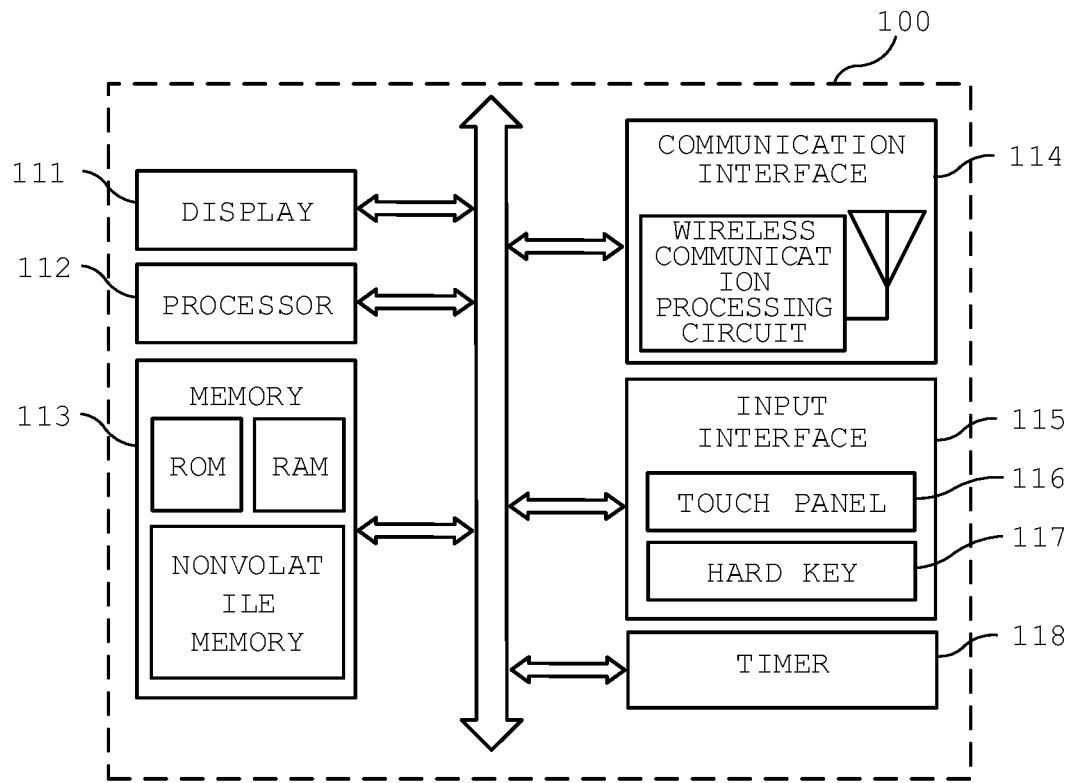
FIG. 3 is a block diagram illustrating an example of a configuration of a terminal device according to the first embodiment of the present disclosure.

FIG. 3 is a block diagram illustrating an example of a configuration of the terminal device 100 according to the first embodiment of the present disclosure. The terminal device 100 does not need to include all the configuration elements illustrated in FIG. 3, and can have a configuration in which a part of the configuration elements is omitted or a configuration to which another configuration element is added.

An example of the terminal device 100 includes a mobile terminal device that can perform wireless communication, represented by a smart phone. However, any terminal device may be employed as long as the terminal device can execute a program for playing the virtual game according to the present embodiment, such as a portable game machine, a feature phone, a portable information terminal, a PDA, a laptop personal computer, a desktop personal computer, a stationary game machine, or an arcade game machine. Further, in a case where the virtual game is played by a plurality of terminal devices, the terminal devices may be of the same type or of different types from one another.

According to FIG. 3, the terminal device 100 includes a display 111, a processor 112, a memory 113, a communication interface 114, an input interface 115 including a touch panel 116 and a hard key 117, and a timer 118. Then, these configuration elements are electrically connected with one another through a control line and a data line.

The display 111 functions as a display unit that reads image information stored in the memory 113 and performs various types of display according to an instruction of the processor 112. Specifically, the display 111 displays characters, virtual items, various parameters, a virtual game space, and the like related to the virtual game according to the present embodiment. The display 111 is configured by a liquid crystal display, for example.

The processor 112 is configured by a CPU (microcomputer), and functions as a control unit that controls connected other configuration elements on the basis of various programs stored in the memory 113. The processor 112 processes instruction commands stored in the memory 113, that is, a program for executing the virtual game according to the present embodiment and a program for executing an OS. As an example, the processor 112 controls, in cooperation with the timer 118, start of counting of an execution time from the start of the virtual game, stop of the counting in a case of receiving an instruction input for the special item by the player, resumption of the counting in a case where a predetermined condition is satisfied, and termination of the execution of the virtual game in a case where the execution time reaches the time limit. Further, the processor 112 controls transition of the play mode of the virtual game between the normal mode and the special mode. Further, the processor 112 controls, in cooperation with the timer 118, activation of an effect associated with each virtual item and counting of an activation time before activating the effect. Note that the processor 112 may be configured by a single CPU or may be configured by a plurality of CPUs. Further, the processor 112 may be configured by an appropriate combination of another type of processor such as a GPU that performs image processing.

The memory 113 includes a RAM, a ROM, or a nonvolatile memory (in some cases, an HDD), and functions as a storage unit. The ROM stores instruction commands for executing the unit game according to the present embodiment, an event, and the OS as programs. The RAM is a memory used to write and read data while the programs stored in the ROM are processed by the processor 112. The nonvolatile memory is a memory in which write and read of data are executed by execution of the programs, and the data written here is saved after the execution of the programs is terminated. The memory 113 at least temporarily stores, as an example, player information received from the server device 200, a normal item information table, a special item information table, a virtual game information table in which time limit information and the like are stored in association with virtual game ID information for specifying the virtual game, various character information used in the virtual game, drawing information of the virtual game space, and the like.

The communication interface 114 includes a wireless communication processing circuit and an antenna connected to the wireless communication processing circuit, and functions as a communication unit. The communication interface 114 transmits and receives the programs necessary for execution of the virtual game according to the present embodiment, the player information, normal item information, special item information, virtual game information, the character information, and the like to and from the server device 200 connected via the network 300. The wireless communication processing circuit performs processing such as modulation and demodulation of the information to be transmitted and received.

The communication interface 114 performs processing on the basis of a broadband wireless communication system represented by a wideband-code division multiple access (W-CDMA) system or a long term evolution (LTE) system. However, the processing can be performed on the basis of a wireless LAN represented by IEEE802.11 or a system related to narrowband wireless communication such as Bluetooth (registered trademark).

The communication interface 114 can use wired communication in place of or in addition to wireless communication. In this case, a communication processing circuit for the wired communication may be provided in place of or in addition to the wireless communication processing circuit.

The input interface 115 includes the touch panel 116 and the hard key 117, and functions as an input unit for reading various types of the input information. The touch panel 116 receives various instruction inputs from the player and is used for operation of icons displayed on the display 111, input of a character string by the user, and the like. The touch panel 116 is arranged to cover the display 111, and outputs information of position coordinates touched by an object (a player's finger, a stylus, or the like) corresponding to image data displayed on the display 111. As a touch panel system, a known system such as a resistive film system, an electrostatic capacitive coupling system, or an ultrasonic surface acoustic wave system can be used. As the hard key 117, a known one can be appropriately used. In the present embodiment, the touch panel 116 and/or the hard key 117 receives an instruction input such as selection or arrangement of the virtual item, as an example.

The timer 118 functions as a timing unit. The timer 118 is used to count the execution time from when the virtual game is executed, an activation time from when the instruction input for arranging the normal item UC in the normal arrangement area 17 to when the effect is activated, an activation time from when the instruction input for arranging the special item AC in the special arrangement area 19 to when the effect is activated, and the like Time information used for the above calculation is stored in the memory 113 as needed under control of the processor 112.

3. Configuration of Server Device 200

Figure 4:
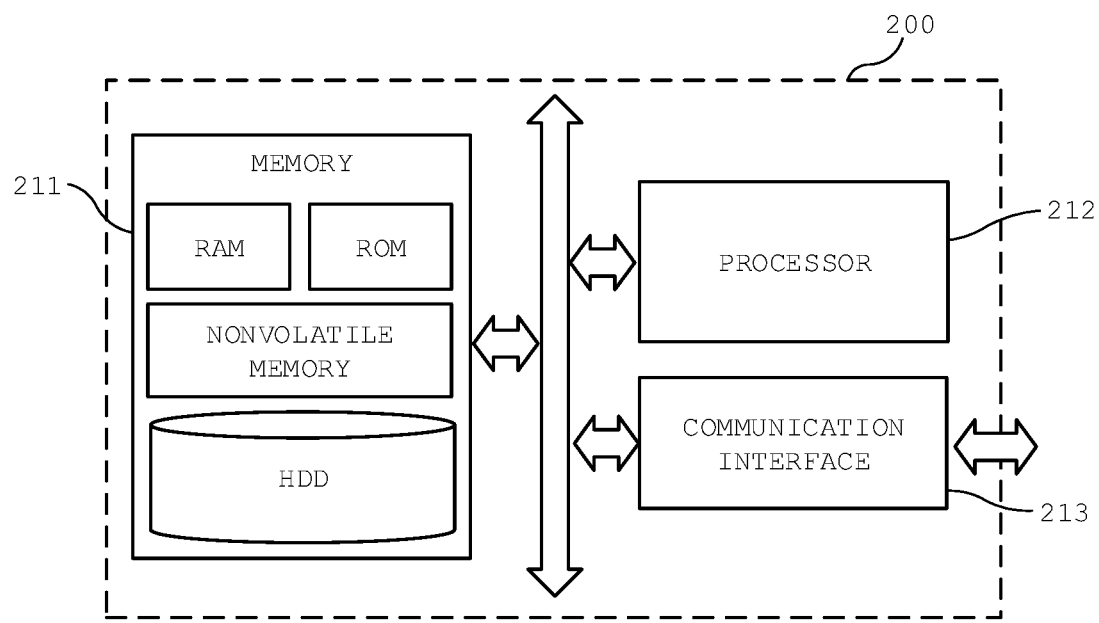
FIG. 4 is a block diagram illustrating an example of a configuration of a server device according to the first embodiment of the present disclosure.

FIG. 4 is a block diagram illustrating an example of a configuration of the server device 200 according to the first embodiment of the present disclosure. The server device 200 does not need to include all the configuration elements illustrated in FIG. 4, and can have a configuration in which a part of the configuration elements is omitted or a configuration to which another configuration element is added.

According to FIG. 4, the server device 200 includes a memory 211 including a RAM, a ROM, a nonvolatile memory, and an HDD, a processor 212 configured by a CPU and the like, and a communication interface 213 including a communication processing circuit. Then, these configuration elements are electrically connected with one another through a control line and a data line.

The memory 211 includes the ROM, the RAM, the nonvolatile memory, and the HDD, and functions as a storage unit. Then, the memory 211 stores the instruction commands for executing the unit game according to the present embodiment, an event, and the OS as programs. Such programs are loaded and executed by the processor 212. Further, the memory 211 is temporarily used to execute write and read of data while the programs are executed by the processor 212. In the present embodiment, the memory 211 stores a player information table, the normal item information table, the special item information table, the virtual game information table in which the time limit and the like are stored in association with a virtual game ID for specifying the virtual game, the various character information used in the virtual game, the drawing information of the virtual game space, and the like.

The processor 212 is configured by a CPU (microcomputer), and functions as a control unit that executes the instruction commands stored in the memory 211, that is, various programs, to control the connected other configuration elements. When receiving a transmission request of the player information necessary for execution of the virtual game together with player identification information from the terminal device 100, the processor 212 performs authentication processing by reference to the player information and controls the memory 211 and the communication interface 213 to transmit the player information and other necessary information. Further, when receiving a request from the terminal device 100 according to the progress of the virtual game, the processor 212 controls the memory 211 and the communication interface 213 to transmit the normal item information, the special item information, the virtual game information, the various character information, the drawing information of the virtual game space, and the like. Note that the processor 212 may be configured by a single CPU or may be configured by a plurality of CPUs.

The communication interface 213 performs, as an example, processing such as modulation and demodulation in order to transmit and receive the programs for executing the virtual game according to the present embodiment and various types of information to and from the terminal device 100 via the network 300, or to and from another server device or another terminal device via the network 300. The communication interface 213 communicates with the terminal devices or another server device according to a known wireless communication system or a known wired communication system. In the present embodiment, the communication interface 213 executes, as an example, processing for transmitting and receiving the normal item information, the special item information, the virtual game information, the various character information, the drawing information of the virtual game space, execution result information of the virtual game, and the like according to the processor 212.

4. Information Stored in Memory 211 of Server Device 200

FIG. 5A is a diagram conceptually illustrating the player information table stored in the memory 211 of the server device 200 according to the first embodiment of the present disclosure. As an example, in this table, pieces of information including virtual item information, stamina information, and hit point information are stored in association with player ID information (player identification information). These pieces of information is transmitted in response to the request from the terminal device 100 and updated on the basis of reception of information from the terminal device 100 as needed when the programs for executing the virtual game is started in the terminal device 100. The "player ID information" is information provided for each player who can execute the virtual game and for specifying each player. The "virtual item information" stores identification information of the normal item UC and the special item AC currently possessed by the player, dividing the information into the normal item information and the special item information. The virtual items currently possessed by the player can be specified by reference to the separately prepared normal item information table and special item information table. The virtual item is acquired or lost by victory or defeat of the virtual game of each player or use of in-game currency, and the virtual item information of the player information table is updated each time. The "stamina information" is a parameter value (stamina value) subtracted by a predetermined consumption value on the basis of each item every time the player arranges the normal item UC or the special item AC in each arrangement area. In a case where the remaining parameter value falls below the consumption value of the virtual item to be arranged, reception of arrangement of the virtual item is restricted. Meanwhile, the subtracted parameter value is recovered to a maximum value according to the elapse of the execution time of the virtual game. Then, in the stamina information, the stamina value at the start of the virtual game and the maximum value of the stamina value are stored. The "hit point information" is a parameter value (hit point value) subtracted in response to an attack by the opponent, and is recovered by use of a virtual item having a recovery effect, termination of the virtual game, or the like. In the virtual game, a player having a smaller remaining hit point value when the execution time of the virtual game reaches the time limit, or a player whose hit point value becomes zero first is determined as a loser. Then, in the hit point information, the hit point value at the start of the virtual game and the maximum value of the hit point value are stored. Although not illustrated, in the player information table, a player character operable by the player and another parameter value may be appropriately stored in association with the player ID information.

Although not specifically illustrated, the memory 211 of the server device 200 may store the virtual game information table in which time limit information storing the time limit from the start to the end of the virtual game, the drawing information for drawing the virtual game space, and the like are stored in association with the virtual game ID information for specifying the virtual game, and a virtual character information table in which drawing information of characters such as the player character and the enemy character, ability value information of the characters, and the like are stored in association with virtual character ID information for specifying the characters.

5. Information Stored in Memory 113 of Terminal Device 100

FIG. 5B is a diagram conceptually illustrating the normal item information table stored in the memory 113 of the terminal device 100 according to the first embodiment of the present disclosure. As an example, in the table, attribute information, consumption value information, attack power information, defense power information, physical power information, and activation time information are stored in association with item ID information (item identification information). The "item ID information" is information given for each normal item UC usable in the virtual game and for specifying each normal item UC. Examples of the "attribute information" include at least one of color attributes such as "blue", "red", and "yellow", shape attributes such as "circle", "triangle", "square", and "star", characteristic attributes such as "fire", "water", and "forest". The correspondence is predetermined for each attribute, and for example, the normal item UC having the "blue" attribute can cancel out the effect of the normal item UC having the "red" attribute (disables activation of the effect of the normal item UC having the "red" attribute). The "consumption value information" is a value subtracted from the stamina value when an appropriate normal item UC is arranged from the selection area 15 to the normal arrangement area 17 in response to the instruction input by the player. The "attack power information" is one of ability values, and is a parameter value used for calculating damage to be given to the enemy character as the opponent or the virtual item of the opponent at the time of an attack with the normal item. The "defense power information" is a parameter value used for calculating damage to be given by an attack from the virtual item of the opponent. The "physical power information" is a parameter value subtracted by a predetermined amount according to the damage given from the virtual item of the opponent, and the normal item UC in which the parameter value becomes zero is erased from the normal arrangement area 17. The "activation time information" stores a time from when the instruction input for the normal item UC is performed and the normal item UC is arranged in the normal arrangement area 17 to when the effect of the normal item UC (the attack on the enemy character or the virtual item of the opponent, or the like) is activated. That is, when the time from when the instruction input for the normal item UC in the selection area 15 is performed and the normal item UC is arranged in the normal arrangement area 17 reaches the stored time, the normal item UC activates the effect.

FIG. 5C is a diagram conceptually illustrating the special item information table stored in the memory 113 of the terminal device 100 according to the first embodiment of the present disclosure. As an example, in the table, attribute information, consumption value information, effect information, activation time information, and the like are stored in association with item ID information (item identification information). The "item ID information" is information given for each special item AC usable in the virtual game and for specifying each special item AC. Examples of the "attribute information" include at least one of color attributes such as "blue", "red", and "yellow", shape attributes such as "circle", "triangle", "square", and "star", characteristic attributes such as "fire", "water", and "forest". The "consumption value information" is a value subtracted from the stamina value when an appropriate special item AC is arranged from the selection area 15 to the special arrangement area 19 in response to the instruction input by the player. In the "effect information", "effect 1" activated when the special item AC is arranged in the special arrangement area 19, and "effect 2" activated when the time from when the special item AC is arranged in the special arrangement area 19 reaches a predetermined activation time are stored. An example of the effect 1 includes an effect in which "the special item AC1 having the "red" attribute stops counting of the time to the activation of the effect of the special item AC having the "blue" attribute to disable the activation of the effect". An example of the effect 2 includes an effect to "apply an attack to halve the remaining hit point or the remaining physical power" to the enemy character or the normal item of the opponent. The "activation time information" stores a time from when the instruction input for the special item AC in the selection area 15 is performed and the special item AC is arranged in the special arrangement area 19 to when the effect 2 of the special item AC is activated. That is, when the time from when the instruction input for the special item AC is performed and the special item AC is arranged in the special arrangement area 19 reaches the stored time, the special item AC activates the effect.

Although not specifically illustrated, the memory 113 of the terminal device 100 may store the virtual game information table in which time limit information storing the time limit from the start to the end of the virtual game, the drawing information for drawing the virtual game space, and the like are stored in association with the virtual game ID information for specifying the virtual game, and a virtual character information table in which drawing information of characters such as the player character and the enemy character, ability value information of the characters, and the like are stored in association with virtual character ID information for specifying the characters.

6. Play Mode of Virtual Game (Normal Mode and Special Mode)

Figure 6:
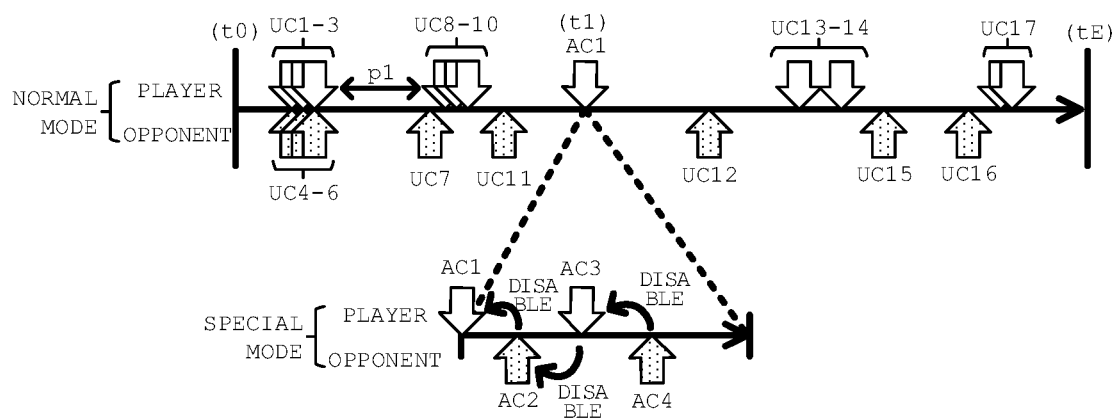
FIG. 6 is a diagram conceptually illustrating progress of a virtual game according to the first embodiment of the present disclosure.

FIG. 6 is a diagram conceptually illustrating the progress of the virtual game according to the first embodiment of the present disclosure. Specifically, FIG. 6 is a diagram for describing the modes (the normal mode and the special mode) in the virtual game. As will be described in detail below, the transition of each mode and the progress of the virtual game in each mode is mainly executed by reading the information and programs from the memory 113 under the control of the processor 112.

According to FIG. 6, when the virtual game is started, the virtual game is first executed in the normal mode. Therefore, the player and the opponent can perform the instruction input for arranging the normal item UC or the special item AC in the normal arrangement area 17 or the special arrangement area 19 at respective desired timings. Here, each virtual item can be arranged by consuming the stamina value when the virtual item is arranged in each arrangement area. In other words, in a case where the stamina value is smaller than the consumption value stored for each virtual item, the virtual item cannot be arranged and the stamina value needs to be recovered. In the example of FIG. 6, since all the stamina value has been consumed when the player has arranged three normal items UC1 to UC3, the player waits without arranging virtual items for a period p1 so that the stamina value becomes equal to or larger than the consumption value of a next normal item UC8.

Further, in the normal mode, the player and the opponent can perform the instruction input for arranging the normal item UC or the special item AC in the normal arrangement area 17 or the special arrangement area 19 at respective desired timings, as described above, except the restriction of the stamina value. Therefore, the instruction inputs for arranging three normal items UC8 to UC10 by the player are received in a row, regardless of turn, between the instruction input for arranging a normal item UC7 and the instruction input for arranging a normal item UC11 by the opponent.

Next, in the example of FIG. 6, at a time t1, the special item AC1 is arranged in the special arrangement area 19 by the instruction input for the special item AC from the player. Then, the virtual game temporarily stops the progress in the normal mode and the progress is transitioned to the special mode. In the special mode, the virtual game progresses in a predetermined order between the player and the opponent. Specifically, the instruction inputs for the special items AC are alternately received between the player and the opponent. In the example of FIG. 6, since the player has arranged the special item AC1 and the play mode is transitioned to the special mode, only the instruction input for the special item AC by the opponent is received next.

Note that the special item AC activates the effect when the activation time of the effect elapses. Further, at the time when the activation is performed, the special mode ends and the play mode is transitioned to the normal mode again. Therefore, in the case where any of the special items AC is arranged, arrangement of another special item AC having an attribute to disable the effect of the arranged special item AC within the activation time is required. In the example of FIG. 6, the play mode has been transitioned to the special mode by the arrangement of the special item AC1 by the player. To disable the effect of the arranged special item AC, a special item AC2 is arranged on the basis of the instruction input by the opponent. Next, to disable the effect of the special item AC2, a special item AC3 is arranged on the basis of the instruction input by the player. Next, to disable the effect of the special item AC3, a special item AC4 is arranged on the basis of the instruction input by the opponent. Here, the player and the opponent do not necessarily need to arrange a new special item to disable the effect of the arranged special item. In the example of FIG. 6, after the special item AC4 is arranged, there is no instruction input for the special item AC by the player within the activation time of the effect. Therefore, the effect is activated after the elapse of the activation time, the special mode ends.

With the end of the special mode, the play mode is transitioned to the normal mode again. In the normal mode, as described above, the player and the opponent can perform the instruction input for arranging the normal item UC or the special item AC in the normal arrangement area 17 or the special arrangement area 19 at respective desired timings, except the restriction of the stamina value. Therefore, in the example of FIG. 6, the instruction inputs for normal items UC13, 14, and 17 and for normal items UC12, 15, and 16 are received and the normal items UC are arranged in the normal arrangement area 17 at desired timings of the player and the opponent, respectively.

Here, in the virtual game, tE is stored in the memory 113 as the time limit information in association with the virtual game ID information, and the virtual game ends when the execution time (an elapsed time from a time t0) from the start of the virtual game becomes the time limit tE. In the example of FIG. 6, when the instruction input for the start of the virtual game is received, the counting of the execution time of the virtual game is started on the basis of the timer 118. Then, the counting of the execution time is continued during the progress of the virtual game in the normal mode. Next, when the instruction input for arranging the special item AC1 in the special arrangement area 19 is received, the play mode is transitioned to the special mode, and the counting of the execution time is temporarily stopped at the time t1. Next, when the effect of the special item AC is activated in the special mode and the play mode is transitioned to the normal mode, the counting of the execution time is resumed from the time t1. Then, when the execution time reaches the time limit tE, the progress of the virtual game is terminated. That is, the virtual game performs counting of the execution time in the normal mode but stops the counting of the execution time in the special mode.

7. Process Flow in Terminal Device 100 (Normal Mode)

FIGS. 7A to 7D are diagrams illustrating processing flows executed in the terminal device 100 according to the first embodiment of the present disclosure. Specifically, FIGS. 7A to 7D are diagrams illustrating processing flows executed in a predetermined cycle by the processor 112 of the terminal device 100 on the basis of the programs stored in the memory 113.

First, a case in which the instruction input for starting the virtual game is performed and the virtual game progresses in the "normal mode" will be described with reference to FIGS. 7A to 7D. According to FIG. 7A, when the processor 112 receives the instruction input for the start of the virtual game by the player through the input interface 115, the processor 112 starts the virtual game and controls the timer 118 to start counting of the execution time (S101). Then, the processor 112 arranges the virtual items including the normal item UC and the special item AC in the selection area 15 (S102).

Next, the processor 112 determines whether the current play mode is the special mode (S103). Since the play mode is currently the normal mode, the processor 112 controls the processing in the normal mode such as S104 to S117. First, the processor 112 determines whether the instruction input by the player for the normal item UC arranged in the selection area 15 has been received (S104). Then, when the instruction input has been received, the processor 112 determines whether the current stamina value of the player is larger than the consumption value of the normal item UC for which the instruction input has been made (S105). In a case where the stamina value is larger than the consumption value, the processor 112 arranges the normal item UC for which the instruction input has been made to the normal arrangement area 17 (S106), and performs control to start counting of the time from when the instruction input has been made (S107). Then, the processor 112 performs control to subtract the consumption value of the arranged normal item UC from the current stamina value stored in the memory 113 and to store the subtracted stamina value (S108). Note that, at this time, in a case of "No" in S104 and S105, the processor 112 moves the processing onto S109 without arranging the normal item UC.

Next, the processor 112 determines whether there is the normal item UC in which the time from when the instruction input for arrangement has been made has reached the activation time in the normal arrangement area 17 (S109). Then, in a case where there is the normal item UC in which the time has reached the activation time, the processor 112 performs attack processing against an enemy character 12 or the virtual item of the opponent (S110) and subtracts the hit point of the enemy character 12 and the physical power of the virtual item and stores subtracted values in the memory 113 (S111).

Although not specifically illustrated, at this time, damage to the enemy character 12 or the virtual item of the opponent is calculated by a known method in consideration of the attack power, the defense power, and the like. Further, in a case where the attribute of the normal item UC of the player and the attribute of the enemy character 12 or the virtual item of the opponent has predetermined correspondence, disablement of or increase/decrease in the attack is possible.

Next, although not specifically illustrated, the processor 112 performs processing according to the instruction input by the opponent (S112), similarly to the processing in S102 to S111 resulting from the instruction input by the player. Then, the processing moves onto the processing flow in FIG. 7B, the processor 112 determines whether the physical powers of the virtual items of both the player and the opponent stored in the memory 113 become equal to or less than zero (S113). In a case where the physical powers become equal to or less than zero, the processor 112 performs processing of deleting the virtual items from the normal arrangement areas 17 and 18 (S114). Next, the processor 112 determines whether the hit point of at least one of the player and the opponent stored in the memory 113 has become equal to or less than zero (S115). Then, in a case where the hit point becomes equal to or less than zero, the processor 112 determines the player or the opponent having the zero hit point as a loser, and performs processing of terminating the virtual game being executed (transmission of execution result information of the virtual game, provision of a reward, update of the player information, and the like) (S116). On the other hand, in a case where the hit points of both the player and the opponent are not equal to or less than zero, the processor 112 determines whether the time has reached the time limit associated with the virtual game by reference to the execution time of the virtual game counted by the timer 118 (S117). Then, in a case where the time has reached the time limit, the processor 112 determines the player or the opponent having a smaller hit point as a "loser", and performs processing of terminating the virtual game being executed similar to the above processing (S116). Then, the processing flow returns to S102 again.

Note that, in the normal mode, as is clear from the above processing flow, the processor 112 does not determine the order of the instruction input made to the selection area 15 or 16. That is, the player or the opponent can perform the instruction input for the normal item UC (or the special item AC) at desired timing as long as the current stamina value of the player or the opponent allows. Therefore, in the normal mode, the progress of the virtual game is carried out in a so-called real-time strategy system.

Figure 8:
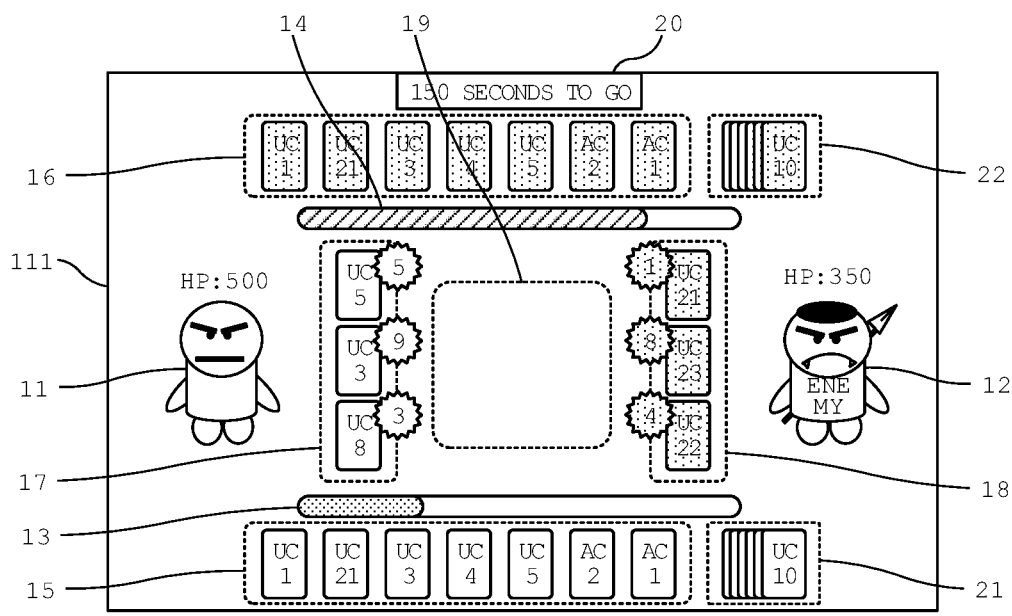
FIG. 8 is a diagram illustrating an example of a screen displayed on a display of the terminal device according to the first embodiment of the present disclosure.

Here, FIG. 8 is a diagram illustrating an example of a screen displayed on the display 111 of the terminal device 100 according to the first embodiment of the present disclosure. Specifically, FIG. 8 illustrates an example of display of the virtual game space in the normal mode. According to FIG. 8, the player character 11 associated with the player and the enemy character 12 associated with the opponent, and the respective current hit points are displayed on the display 111. Then, in the selection area 15, a predetermined number of virtual items (the normal item UC and the special item AC) is displayed and is selectable via the input interface 115. Further, the virtual item replenished when the instruction input for any of the virtual items is performed from the selection area 15 and the virtual item is arranged in the normal arrangement area 17 is displayed in the stock area 21. When the instruction input for any of the normal items UC displayed in the selection area 15 is received, the normal item UC for which the instruction input has been made is moved to and displayed in the normal arrangement area 17 (for example, the normal items UC3, UC5, and UC8). Then, a remaining time to reach the activation time to activate the effect is displayed on the upper right part of each of the normal items UC arranged in the normal arrangement area 17. Further, the stamina value is subtracted as the normal item UC is arranged in the normal arrangement area 17. The stamina value is displayed in the stamina display area 13 in a manner that the remaining stamina value and the maximum value are visually recognized. Further, the execution time display area 20 displays the remaining time to reach the time limit of the virtual game by counting the execution time from the start of the virtual game.

8. Processing Flow in Terminal Device 100 (Transition from Normal Mode to Special Mode)

Next, processing flows in a case where the play mode is transitioned from the normal mode to the special mode will be described with reference to FIGS. 7A to 7D. In the normal mode, when the processing returns to S102 again, the processor 112 adds one virtual item and arranges the virtual item to the selection area 15 in a case where there is a normal item UC selected in the selection area 15 and arranged to the normal arrangement area 17 (S102). Then, since the play mode is currently the normal mode, the processing proceeds to "No" in S103. Next, in S104, the processor 112 determines whether the instruction input for selecting the normal item UC arranged in the selection area 15 has been received (S104). Here, the case is described in which the instruction input for the special item AC is received and the play mode is transitioned from the normal mode to the special mode. Therefore, the processing moves onto S118.

The processor 112 determines whether the instruction input for selecting the special item AC arranged in the selection area 15 has been received (S118). As described above, the case is described in which the instruction input for the special item AC is received and the play mode is transitioned from the normal mode to the special mode. Therefore, "Yes" is determined. Next, the processing moves onto the processing flow in FIG. 7C, and the processor 112 determines whether the current stamina value of the player is larger than the consumption value of the special item AC for which the instruction input has been made (S119). In a case where the stamina value is larger than the consumption value, the processor 112 arranges the special item AC for which the instruction input has been made to the special arrangement area 19 (S120), and performs control to start counting of the time from when the instruction input has been made (S121). Then, the processor 112 performs control to subtract the consumption value of the arranged special item AC from the current stamina value stored in the memory 113 and store the subtracted stamina value (S122).

When the instruction input for the special item AC has been made and the special item AC is arranged in the special arrangement area 19, the play mode is transitioned from the normal mode to the special mode. Therefore, the processor 112 performs processing of temporarily stopping the execution time by the timer 118 (S123). Then, the processor 112 performs processing of transitioning the play mode from the normal mode to the special mode, and completes the transition.

Note that, when the play mode is transitioned to the special mode and the counting of the execution time is stopped, the processor 112 can perform processing of stopping the counting of the activation time of the effect of the normal item UC arranged in the normal arrangement area 17.

Further, in the above description, the case has been described where the instruction input for the special item AC by the player is received in the normal mode. However, even in a case where the instruction input by the opponent is received in the normal mode, similar processing is performed.

Figure 9:
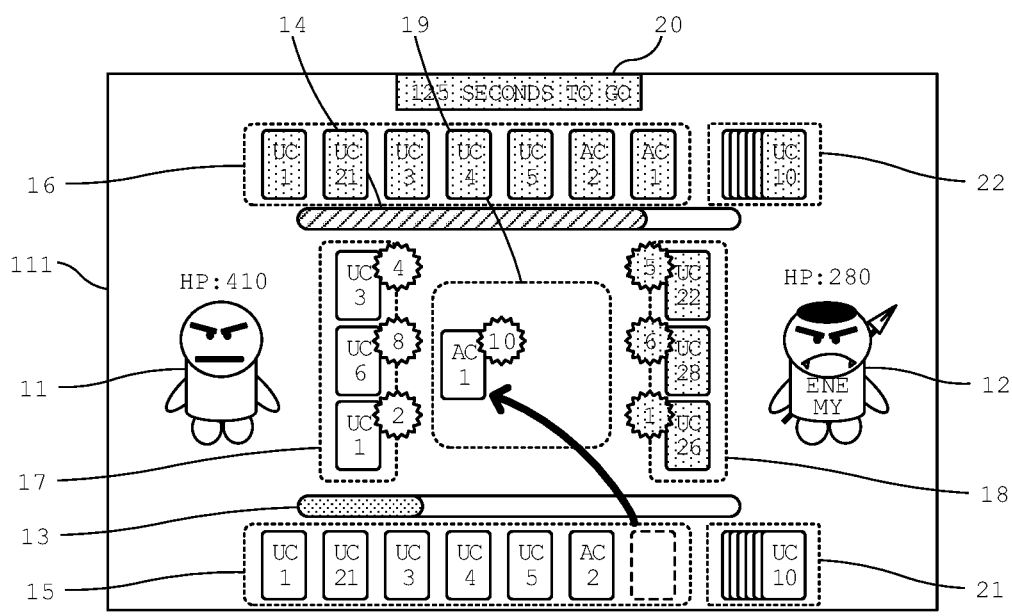
FIG. 9 is a diagram illustrating an example of a screen displayed on the display of the terminal device according to the first embodiment of the present disclosure.

FIG. 9 is a diagram illustrating an example of a screen displayed on the display 111 of the terminal device 100 according to the first embodiment of the present disclosure. Specifically, FIG. 9 is a diagram illustrating an example of display of the virtual game space when the instruction input for the special item AC is received in the normal mode, and the play mode is transitioned to the special mode. According to FIG. 9, when the instruction input by the player is received, the special item AC1 arranged in the selection area 15 is moved to and arranged in the special arrangement area 19. Then, with the movement, to perform processing of transitioning the play mode to the special mode by the processor 112, the remaining time displayed in the execution time display area 20 is stopped at 125 seconds. Further, to stop the counting of the activation time of the effect of the normal item UC arranged in the normal arrangement area 17, the activation times of the effect displayed on the upper right parts of the normal items UC arranged in the normal arrangement areas 17 and 18 are also stopped. Meanwhile, the remaining time to reach the activation time to activate the effect is displayed on the upper right part of each of the special items AC arranged in the special arrangement area 19 in a manner to decrease over time.

9. Processing Flow in Terminal Device 100 (Special Mode and Transition from Special Mode to Normal Mode)

Next, a processing flow of the special mode will be described with reference to FIGS. 7A to 7D. When the play mode is transitioned from the normal mode to the special mode and the processing is returned S102 again, the processor 112 adds and arranges one virtual item to the selection area 15 (S102). Then, since the play mode is currently the special mode, the processing proceeds to "Yes" in S103 and moves onto S124 (FIG. 7D).

Next, the processor 112 determines whether the instruction input by the player for the special item AC arranged in the selection area 15 has been received (S124). In the present embodiment, in the special mode, only the instruction input for the special item AC is received and reception of the instruction input for the normal item UC is restricted. Therefore, in S124, in a case where the instruction input for the normal item UC is received or in a case where no instruction input has been made, "No" is determined and the processing moves onto S132. Meanwhile, in a case where the instruction input for the special item AC is received, the processor 112 determines whether the turn is for the player who has made the instruction input in S124.

Specifically, in a case where the player has arranged the special item AC in the previous turn, the next turn is for the opponent. Therefore, the processor 112 determines whether the instruction input in S124 has been made by the opponent, that is, whether the instruction input in S124 is an instruction input for the special item AC in the selection area 16 of the opponent. On the other hand, in a case where the opponent has arranged the special item AC in the previous turn, the next turn is for the player. Therefore, the processor 112 determines whether the instruction input in S124 has been made by the player, that is, whether the instruction input in S124 is an instruction input for the special item AC in the selection area 15 of the player. Then, in a case where the turn is determined to be the turn for the player himself/herself, the processing continuously moves onto S126.

The processor 112 determines whether the current stamina value of the player is larger than the consumption value of the special item AC for which the instruction input has been made (S126). In a case where the stamina value is larger than the consumption value, the processor 112 arranges the special item AC for which the instruction input has been made to the special arrangement area 19 (S127), and performs control to start counting of the time from when the instruction input has been made (S128). Then, the processor 112 performs control to subtract the consumption value of the arranged special item AC from the current stamina value stored in the memory 113 and store the subtracted stamina value (S129). Note that, at this time, in a case where "No" is determined in S124 to S126, such as a case where the instruction input for the normal item UC has been made or a case where no instruction input for any of the virtual items has been made, the processor 112 moves the processing onto S132 without arranging the special item AC.

Next, the processor 112 determines whether there is a special item AC already arranged in the special arrangement area 19 (S130). In a case where there is a special item, the processor 112 reads the attributes stored in advance in association with the already arranged special item AC and a newly arranged special item AC. Then, the processor 112 determines whether the read attributes have predetermined correspondence (the effect 1 in FIG. 5C). In a case where the correspondence is exhibited, the processor 112 stops the counting of the activation time of the effect of the already arranged special item AC to disable the effect (S131).

Next, the processor 112 determines whether there is the special item AC in which the time from when the instruction input for arrangement has been made has reached the activation time in the special arrangement area 19 (S132). Then, in a case where there is the special item AC in which the time has reached the activation time, the processor 112 activates the effect of the special item AC by reference to the special item information table stored in the memory 113 (S133). An example of the effect includes an effect to "apply an attack to halve the remaining hit point or the remaining physical power". Then, when the effect is activated, the processor 112 subtracts the hit point of the enemy character 12 and the physical power of the virtual item, and stores subtracted values in the memory 113 (S134). Note that, since the above effect is the effect to decrease the hit point and the physical power, the subtraction processing has been performed. However, the processor 112 performs processing of varying the various parameters such as the hit point, the physical power, the attack power, and the defense power according to the effect.

Next, the processor 112 terminates the special mode when the effect of any of the special items AC is activated. Therefore, the processor 112 performs processing of resuming the counting of the execution time by the timer 118 (S135), and performs processing of resuming the counting of the activation time of the effect of the normal item UC.

FIG. 9 is a diagram illustrating an example of a screen displayed on the display 111 of the terminal device 100 according to the first embodiment of the present disclosure. Specifically, FIG. 9 is a diagram illustrating an example of display of the virtual game space when the instruction input for the special item AC is received in the normal mode, and the play mode is transitioned to the special mode. According to FIG. 9, when the instruction input by the player is received, the special item AC1 arranged in the selection area 15 is moved to and arranged in the special arrangement area 19. Then, with the movement, to perform processing of transitioning the play mode to the special mode by the processor 112, the remaining time displayed in the execution time display area 20 is stopped at 125 seconds. Further, to stop the counting of the activation time of the effect of the normal item UC arranged in the normal arrangement area 17, the activation times of the effect displayed on the upper right parts of the normal items UC arranged in the normal arrangement areas 17 and 18 are also stopped. Meanwhile, the remaining time to reach the activation time to activate the effect is displayed on the upper right part of each of the special items AC arranged in the special arrangement area 19 in a manner to decrease over time.

Figure 7A:
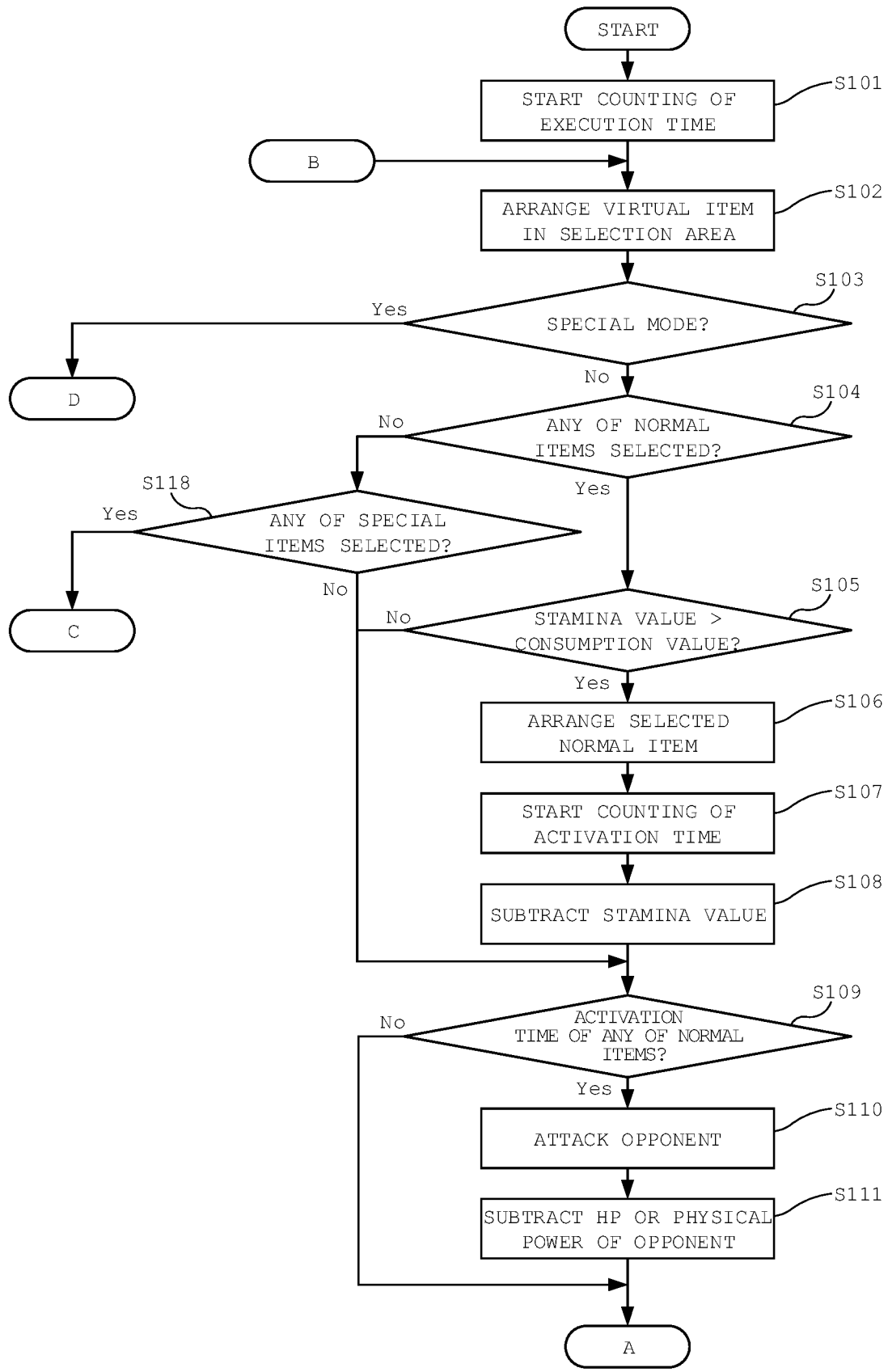
FIG. 7A is a diagram illustrating a processing flow executed in the terminal device according to the first embodiment of the present disclosure.
Figure 7B:
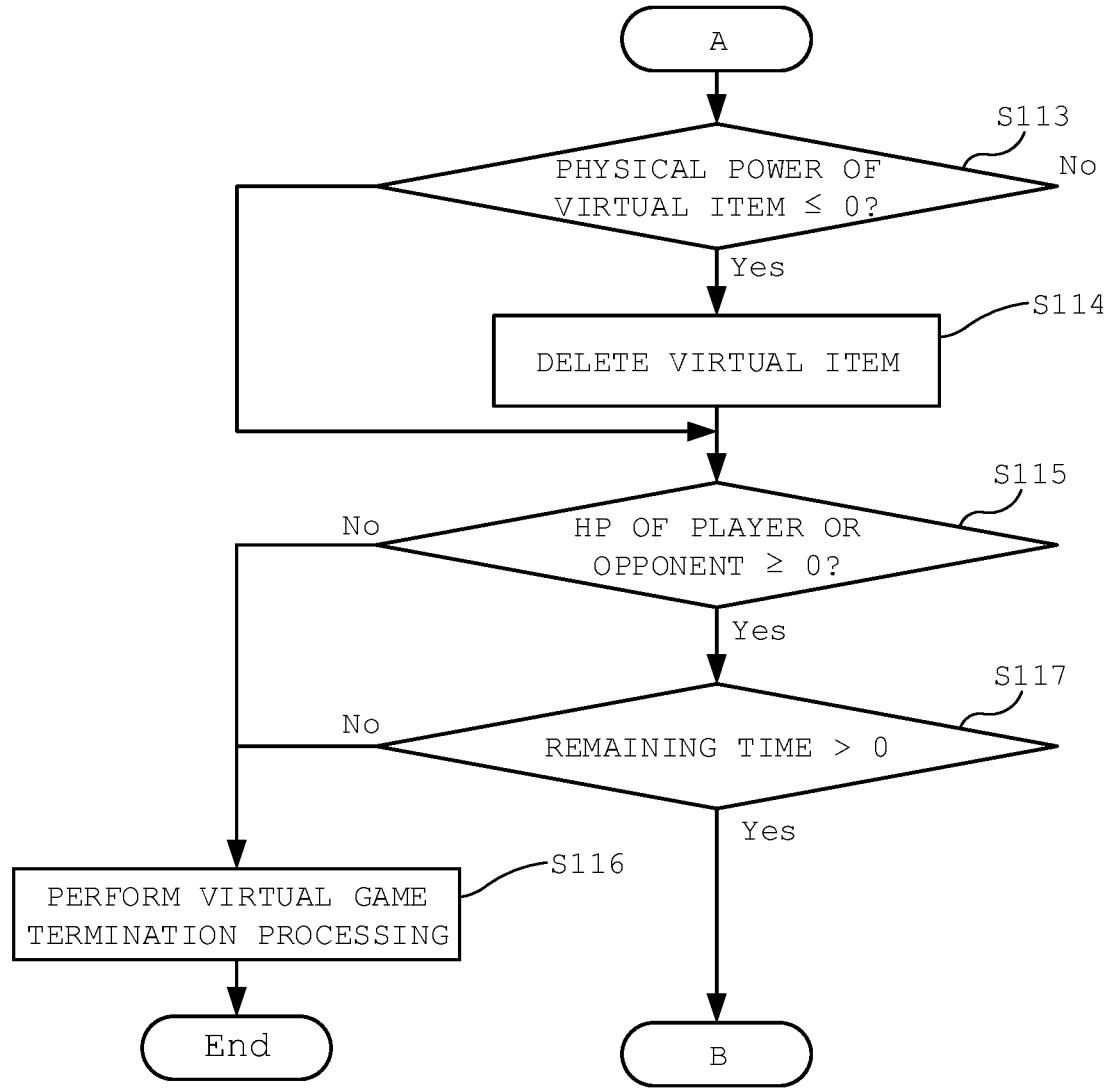
FIG. 7B is a diagram illustrating a processing flow executed in the terminal device according to the first embodiment of the present disclosure.
Figure 7C:
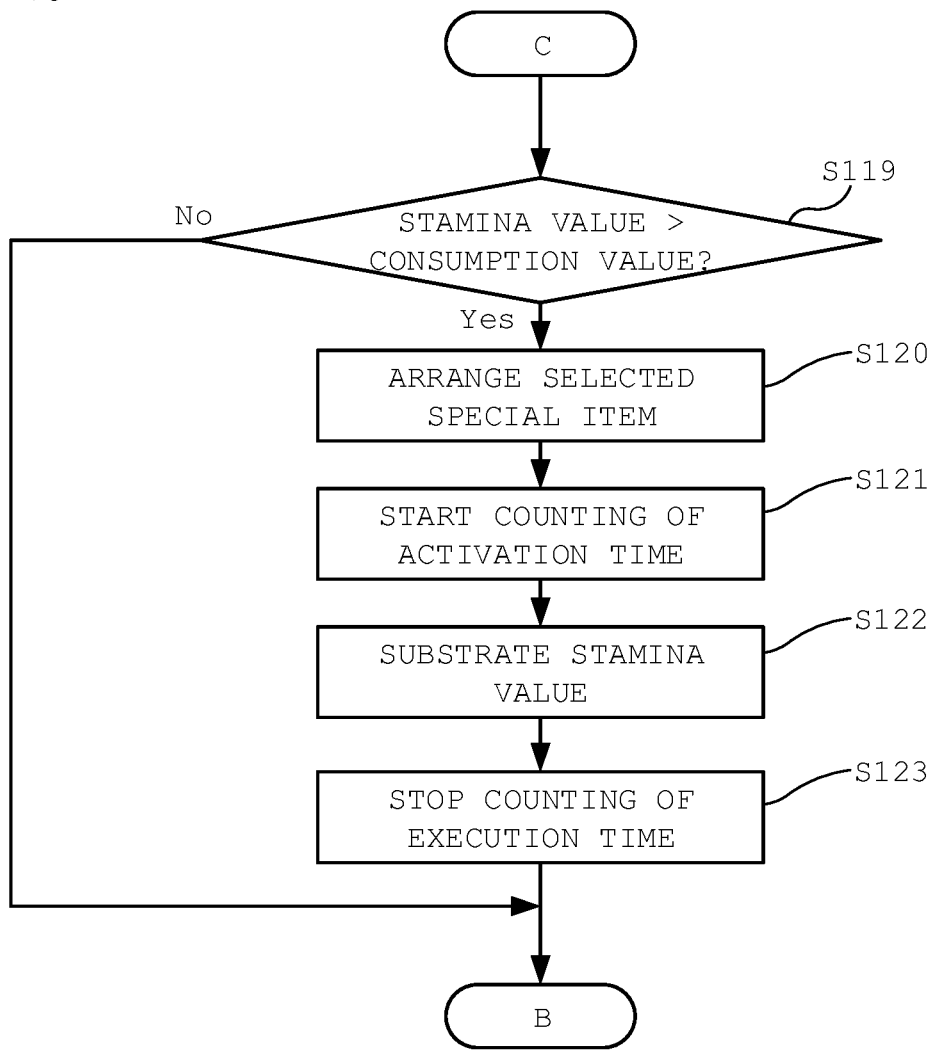
FIG. 7C is a diagram illustrating a processing flow executed in the terminal device according to the first embodiment of the present disclosure. Further.
Figure 7D:
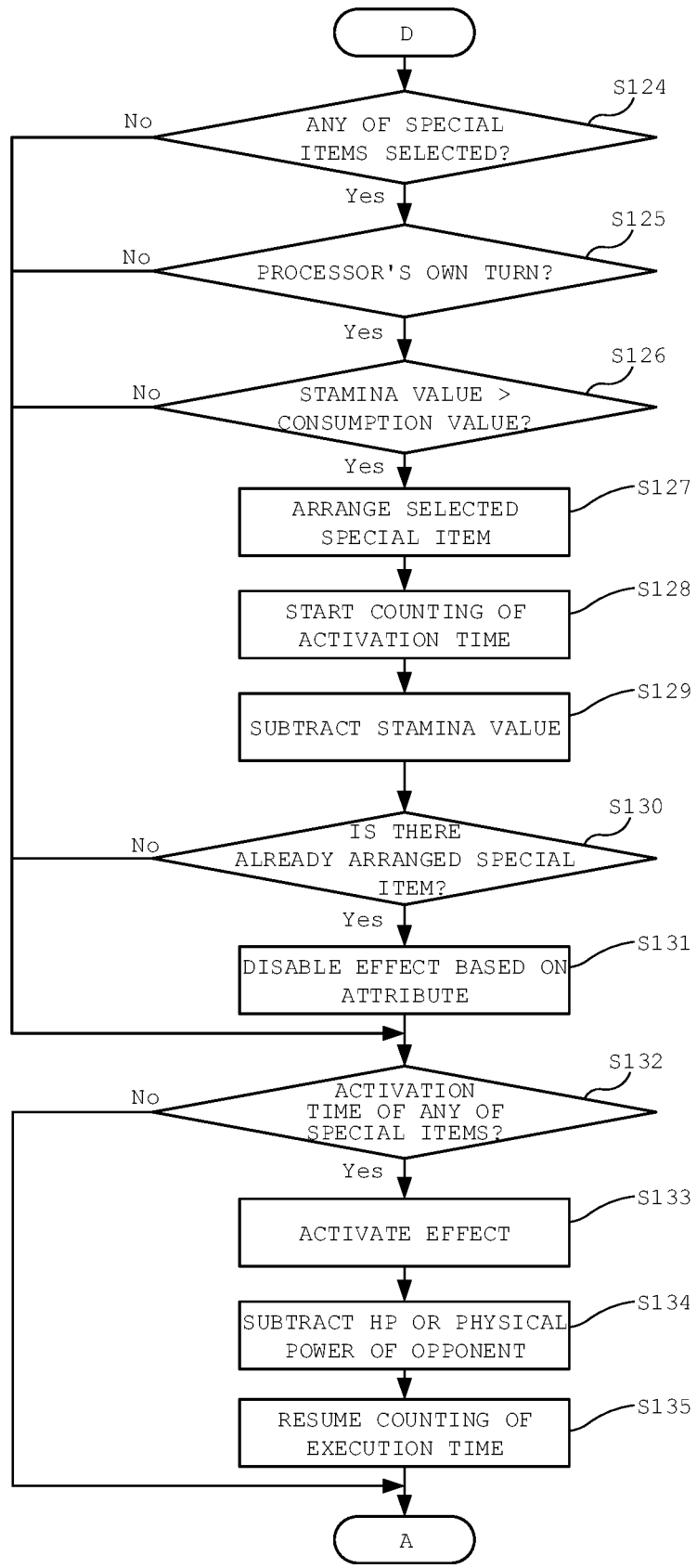
FIG. 7D is a diagram illustrating a processing flow executed in the terminal device according to the first embodiment of the present disclosure.

Next, the processing moves onto the processing flow in FIG. 7B, the processor 112 determines whether the physical powers of the virtual items of both the player and the opponent stored in the memory 113 become equal to or less than zero (S113). In a case where the physical powers become equal to or less than zero, the processor 112 performs processing of deleting the virtual items from the normal arrangement areas 17 and 18 (S114). Next, the processor 112 determines whether the hit point of at least one of the player and the opponent stored in the memory 113 has become equal to or less than zero (S115). Then, in a case where the hit point becomes equal to or less than zero, the processor 112 determines the player or the opponent having the zero hit point as a loser, and performs processing of terminating the virtual game being executed (transmission of execution result information of the virtual game, provision of a reward, update of the player information, and the like) (S116). On the other hand, in a case where the hit points of both the player and the opponent are not equal to or less than zero, the processor 112 determines whether the time has reached the time limit associated with the virtual game by reference to the execution time of the virtual game counted by the timer 118 (S117). Then, in a case where the time has reached the time limit, the processor 112 determines the player or the opponent having a smaller hit point as a "loser", and performs processing of terminating the virtual game being executed similar to the above processing (S116). Then, the processing flow returns to S102 again and the processing in the normal mode is executed.

Note that, in the special mode, as is clear from the above processing flow, the processor 112 determines whether the turn is for its own turn in S125. Then, only in a case where the turn is determined to be for its own turn, the instruction input for arrangement of the special item AC is received. Therefore, in the special mode, the progress of the virtual game is carried out in a so-called turn-based strategy system.

Figure 10:
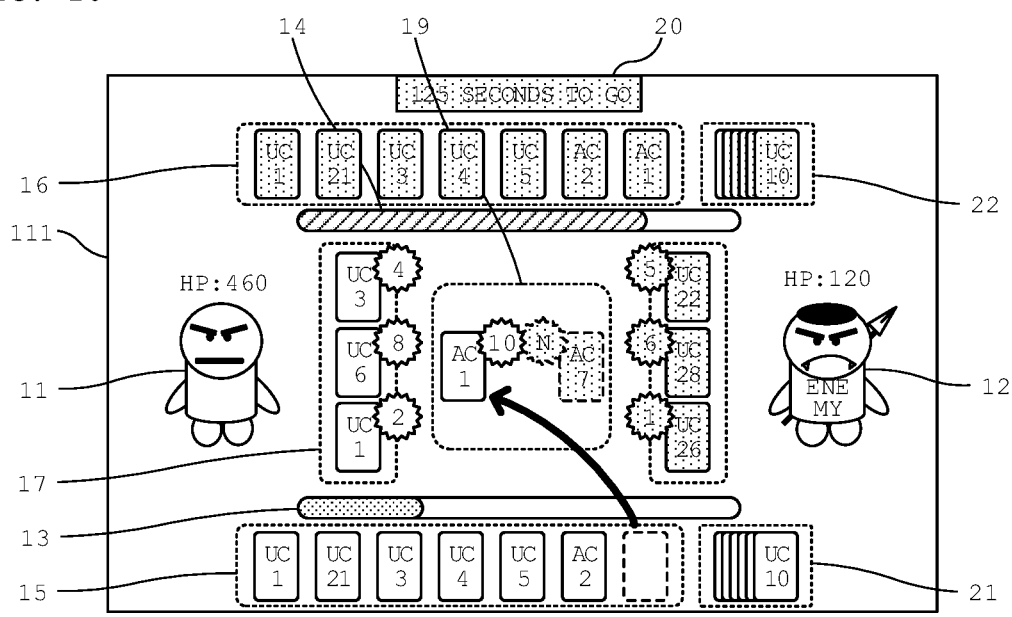
FIG. 10 is a diagram illustrating an example of a screen displayed on the display of the terminal device according to the first embodiment of the present disclosure.

FIG. 10 is a diagram illustrating an example of a screen displayed on the display 111 of the terminal device 100 according to the first embodiment of the present disclosure. Specifically, FIG. 10 is a diagram illustrating an example of display of the virtual game space in a case where the instruction input for the special item AC1 by the player is received when the special item AC7 has already been arranged by the opponent in the special mode. According to FIG. 9, the turn is transferred to the player as the opponent has arranged the special item AC7 in the previous turn. Therefore, when the instruction input by the player is received, the special item AC1 arranged in the selection area 15 is moved to and arranged in the special arrangement area 19. Then, with the movement, the processor 112 reads the attribute information stored in association with both the special items AC, and disables the effect of the special item AC7. Further, since the play mode is currently the special mode, the remaining time displayed in the execution time display area 20 is stopped at 125 seconds. Further, the activation times of the effect displayed on the right upper parts of the normal items UC arranged in the normal arrangement areas 17 and 18 are also stopped. Meanwhile, the remaining time to reach the activation time to activate the effect is displayed on the upper right part of each of the special items AC newly arranged in the special arrangement area 19 in a manner to decrease over time. In a case where the remaining time becomes zero, the processor 112 performs control to display activation of the effect.

As described above, in the present embodiment, progress of more various virtual games becomes possible using the real-time strategy system (the normal mode, for example) in which the player and the opponent can perform the instruction inputs at desired timings respectively and the turn-based strategy system (the special mode, for example) in which the player and the opponent perform the instruction inputs in the predetermined order, in combination. Further, even in the special mode in the turn-based strategy system, the player can disable the effect if the player arranges the player's own special item AC before the effect of the special item AC arranged by the opponent is activated. Therefore, temporal restriction is set for the instruction input by the player, and a virtual game in the turn-based strategy system yet a more thrilling virtual game can be provided.

Other Embodiments

In the first embodiment, an example has been described in which the programs and various types of information related to the virtual game are received in advance from the server device 200 and various types of processing are performed in the terminal device 100. However, as described below, the virtual game system according to the present disclosure can be implemented in appropriately modified various embodiments.

For example, in the first embodiment, various types of processing have been performed mainly by the processor 112 of the terminal device 100. However, the terminal device 100 may perform reception of the instruction input by the input interface 115, processing of transmitting the received instruction input to the server device 200 via the communication interface 114, processing of receiving processing results of FIGS. 7A to 7D from the server device 200 via the communication interface 114, and processing of displaying the received information on the display 111, and the server device 200 may execute, by the processor 212, the processing of FIGS. 7A to 7D based on the instruction input received from the terminal device 100.

Further, in the first embodiment, even if a plurality of the special items AC is arranged in the special arrangement area 19, the play mode is transitioned to the normal mode when the time reaches the activation time of any of the special items AC and the effect is activated in the special mode (S132 to S135). However, the processing in the special mode is repeated until the effect of all the special items AC is activated and when all the special items AC are activated, the play mode may be transitioned to the normal mode.

Further, in the first embodiment, when the play mode is transitioned from the normal mode to the special mode, the counting of the execution time of the virtual game is stopped in S123 and the counting of the activation time of the effect of the normal item UC is also stopped. However, the counting of the activation time of the effect of the normal item UC is continuously performed, and when the activation time of the effect elapses even in the special mode, the effect of the normal item UC may be activated.

Further, in the first embodiment, as the effect of the special item AC, an example of "applying an attack to halve the remaining hit point or the remaining physical power" has been described. However, the effect of the special item AC is not limited to the case. The various parameter values such as the hit point, the physical power, the attack power, and the defense power may be influenced. Further, for example, the execution time of the virtual game may be influenced by being forcibly made zero or being decreased/increased. Further, the predetermined turn may be changed in the special mode.

As described above, even in the above various embodiments, progress of more various virtual games becomes possible using the real-time strategy system (the normal mode, for example) in which the player and the opponent can perform the instruction inputs at desired timings respectively and the turn-based strategy system (the special mode, for example) in which the player and the opponent perform the instruction inputs in the predetermined order, in combination. Further, even in the special mode in the turn-based strategy system, the player can disable the effect if the player arranges the player's own special item AC before the effect of the special item AC arranged by the opponent is activated. Therefore, temporal restriction is set for the instruction input by the player, and a virtual game in the turn-based strategy system yet a more thrilling virtual game can be provided.

The processing and the procedures described in the present specification are not limited by the explicitly described embodiments, and can be realized by software, hardware, or a combination of the software and the hardware. To be specific, the processing and procedures described in the present specification are realized by mounting a logic corresponding to the processing to a medium such as an integrated circuit, a volatile memory, a nonvolatile memory, a magnetic disk, or an optical storage. Further, the processing and procedures described in the present specification can be mounted as a computer program and executed by various types of computers including a terminal device and a server device.

Even if description has been given such that the processing and procedures described in the present specification are executed by a single device, software, component, or module, the processing and procedures can be executed by a plurality of devices, pieces of software, components, and/or modules. Further, even if description has been given such that the various types of information described in the present specification are stored in a single memory or storage unit, such information can be distributed and stored in a plurality of memories included in a single device or a plurality of memories distributed and arranged in a plurality of devices. Further, the elements of software and hardware described in the present specification can be realized by being integrated into a smaller number of configuration elements or by being decomposed into a larger number of configuration elements.

The terminal device, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A terminal device comprising:
an input interface configured to receive an instruction input from a player;
a timer configured to count a time in a virtual game executed by the instruction input received from the player via the input interface;
a memory configured to store computer readable instructions, item information regarding a special item associated with player identification information identifying the player and a normal item different from the special item, an activation time of the normal item, and a time limit in which the virtual game is executable; and
a processor configured to execute the computer readable instructions so as to:
cause the timer to start counting of an execution time of the virtual game when the instruction input for start of the virtual game is received via the input interface;
cause the timer to start counting of the activation time of the normal item when the instruction input for the normal item is received via the input interface;
cause the timer to stop counting of the execution time and stop counting the activation time of the normal item when the instruction input for the special item is received via the input interface;
cause the timer to resume counting of the execution time and resume counting of the activation time of the normal item when a predetermined condition is satisfied in the virtual game; and
terminate the virtual game when the processor determines that the execution time reaches the time limit.

2. The terminal device according to claim 1,
wherein the virtual game is a virtual battle game in which the player plays against one or a plurality of opponents in a virtual game space.

3. The terminal device according to claim 2,
wherein the processor is configured to cause the input interface to receive the instruction input for items including the special item at desired timing of the player during the counting of the execution time, and
the processor is configured to cause the input interface to receive the instruction input for the items including the special item in an order determined in advance between the player and the one or the plurality of opponents during the stop of the counting of the execution time.

4. The terminal device according to claim 2,
wherein the memory is configured to further store an effect of the special item in association with the special item and an activation time that is a period of time from when the instruction input for the special item has been received via the input interface to when the effect of the special item is activated, and
the processor is configured to activate the effect of the special item when the time counted by the timer reaches the activation time of the special item.

5. The terminal device according to claim 4,
wherein the predetermined condition is the activation of the effect of the special item.

6. The terminal device according to claim 4,
wherein the processor is configured to disable the activation of the effect of the special item in response to selection of another special item by the one or a plurality of opponents.

7. The terminal device according to claim 1,
wherein the memory is configured to further store an effect of the normal item in association with the normal item,
the activation time is a period of time from when the instruction input for the normal item has been received via the input interface to when the effect of the normal item is activated, and
the processor is configured to activate the effect of the normal item when the time counted by the timer reaches the activation time of the normal item.

8. The terminal device according to claim 1,
wherein the processor is configured to cause the timer to stop counting of the activation time of the normal item during the stop of the counting of the execution time.

9. The terminal device according to claim 1,
wherein the processor is configured to restrict the input interface to receive the instruction input for the normal item by the player during the stop of the counting of the execution time.

10. The terminal device according to claim 1, wherein
the memory is configured to further store a parameter value that is subtracted in response to the reception of the instruction input for the special item, and
the processor is configured to recover the subtracted parameter value over time while the processor is configured to restrict the input interface to receive the instruction input for the special item in a case where the parameter value is equal to or less than a predetermined value.

11. A computer program product embodying computer readable instructions stored on a non-transitory computer readable storage medium for causing a computer to execute a process by a processor, the computer including:
an input interface configured to receive an instruction input from a player;
a timer configured to count a time in a virtual game executed by the instruction input received from the player via the input interface; and
a memory configured to store item information regarding a special item associated with player identification information identifying the player and a normal item different from the special item, an activation time of the normal item, and a time limit in which the virtual game is executable,
the computer configured to perform the steps of:
causing the timer to start counting of an execution time of the virtual game when the instruction input for start of the virtual game is received via the input interface;
causing the timer to start counting of the activation time of the normal item when the instruction input for the normal item is received via the input interface;
causing the timer to stop counting of the execution time and stop counting the activation time of the normal item when the instruction input for the special item is received via the input interface;
causing the timer to resume counting of the execution time and resume counting of the activation time of the normal item when a predetermined condition is satisfied in the virtual game; and
terminating the virtual game when the execution time reaches the time limit.

12. The computer program product according to claim 11,
wherein the memory is configured to further store an effect of the special item in association with the special item and an activation time that is a period of time from when the instruction input for the special item has been received via the input interface to when the effect of the special item is activated, and the computer is configured to activate the effect of the special item when the time counted by the timer reaches the activation time of the special item.

13. The computer program product according to claim 11, wherein the predetermined condition is the activation of the effect of the special item.

14. The computer program product according to claim 11, wherein the memory is configured to further store an effect of the normal item in association with the normal item, the activation time is a period of time from when the instruction input for the normal item has been received via the input interface to when the effect of the normal item is activated, and the computer is configured to activate the effect of the normal item when the time counted by the timer reaches the activation time of the normal item.

15. The computer program product according to claim 11, wherein the computer is configured to restrict the input interface to receive the instruction input for the normal item by the player during the stop of the counting of the execution time.

16. A method for causing a processor in a computer to execute a process, the computer including:
    an input interface configured to receive an instruction input from a player;
    a timer configured to count a time in a virtual game executed by the instruction input received from the player via the input interface; and
    a memory configured to store the computer readable instructions, item information regarding a special item associated with player identification information identifying the player and a normal item different from the special item, an activation time of the normal item, and a time limit in which the virtual game is executable,
    the method comprising executing the computer readable instructions on the processor the steps of:
        causing the timer to start counting of an execution time of the virtual game when the instruction input for start of the virtual game is received via the input interface;
        causing the timer to start counting of the activation time of the normal item when the instruction input for the normal item is received via the input interface;
        causing the timer to stop counting of the execution time and stop counting the activation time of the normal item when the instruction input for the special item is received via the input interface;
        causing the timer to resume counting of the execution time and resume counting of the activation time of the normal item when a predetermined condition is satisfied in the virtual game; and
        terminating the virtual game when the processor determines that the execution time reaches the time limit.

17. The method according to claim 16, wherein the memory is configured to further store an effect of the special item in association with the special item and an activation time that is a period of time from when the instruction input for the special item has been received via the input interface to when the effect of the special item is activated, and the processor is configured to activate the effect of the special item when the time counted by the timer reaches the activation time of the special item.

18. The method according to claim 16, wherein the predetermined condition is the activation of the effect of the special item.

19. The method according to claim 16, wherein the memory is configured to further store an effect of the normal item in association with the normal item, the activation time is a period of time from when the instruction input for the normal item has been received via the input interface to when the effect of the normal item is activated, and the processor is configured to activate the effect of the normal item when the time counted by the timer reaches the activation time of the normal item.

20. The method according to claim 16, wherein the processor is configured to restrict the input interface to receive the instruction input for the normal item by the player during the stop of the counting of the execution time.

* * * * *